United States Patent

[11] 3,542,163

[72] Inventor James C. Cumming
Pleasant Ridge, Michigan
[21] Appl. No. 781,439
[22] Filed Dec. 5, 1968
[45] Patented Nov. 24, 1970
[73] Assignee Rockwell-Standard Company
Pittsburgh, Pennsylvania
a corporation of Delaware.

[54] PLURAL BRAKE ACTUATORS AND CIRCUIT MEANS THEREFOR
5 Claims, 6 Drawing Figs.

[52] U.S. Cl. ................................................. 188/152
[51] Int. Cl. ................................................. B60t 11/20
[50] Field of Search ............................................. 188/152.04;
60/54.5, 54.6E

[56] References Cited
UNITED STATES PATENTS
2,239,751 4/1941 Kritzer ........................ 60/54.5(E)UX
3,033,324 5/1962 Lepelletier ................. 188/152(.04)UX
3,254,742 6/1966 Brownyer et al. ........... 188/152(.04)UX
3,256,962 6/1966 Cumming ................... 188/152(.04)UX
3,305,051 2/1967 Maurice .................... 188/152(.04)UX Primary Examiner—George E. A. Halvosa
Attorney—Strauch, Nolan, Neale, Nies & Kurz ABSTRACT: A vehicle brake system in which the braking force developed by the application of primary brakes at one set of wheels is utilized to apply the secondary brakes at another set of wheels. A dual primary actuating circuit energizes the primary brakes and a dual secondary circuit connects the primary brakes to the secondary brakes. The circuits are so arranged that balanced braking is maintained at the primary brakes and the secondary brakes despite failure of any component in either circuit.

Patented Nov. 24, 1970

INVENTOR.
JAMES C. CUMMING
BY
Strauch Nolan Neale Nies + Kurz
ATTORNEYS

Patented Nov. 24, 1970

INVENTOR.
JAMES C. CUMMING
BY
Strauch Nolan Neale Nies + Kurz
ATTORNEYS

PLURAL BRAKE ACTUATORS AND CIRCUIT MEANS THEREFOR

BACKGROUND OF THE INVENTION

The advantages of utilizing the torque reaction forces developed by the application of one or more vehicle brakes to provide a source of power for actuation of the remaining vehicle brakes have long been recognized. Typically, in such a system the primary brakes are associated with the wheels carrying the smaller portion of the vehicle load and are actuated in the usual manner. The resulting torque reaction is utilized to develop fluid pressure in a power cylinder which in turn actuates the remaining vehicle brakes which are thus termed secondary brakes. Such a system is disclosed, for example, in U.S. Pat. No. 3,254,742. While systems of this type have a number of advantages, they are especially vulnerable to failure in the event of breakage of the pressure lines, particularly the lines associated with the primary system since the brakes act in series rather than in parallel as in the case of the usual more conventional system.

Prior attempts to overcome this deficiency have not been successful. In general the prior proposals have been unduly complex, thus nullifying the advantage of the torque responsive system itself or they have produced an unbalanced braking condition upon component failure, i.e., they are effective to preserve the integrity of the brakes only at one side of the vehicle and generally permit total loss of braking effort at one or more of the vehicle wheels.

SUMMARY OF THE INVENTION

It is the principal purpose and object of the present invention to provide improved torque reaction brake systems which are effective, upon failure of any component, to retain effective braking action at each of the primary and secondary brakes.

It is a further object of the present invention to provide an improved torque reaction brake system in which, upon failure of any system component, there is an acceptable reduction in total braking force, the reduction being distributed evenly between brakes at the opposite sides of the vehicle.

It is a further object of the present invention to provide improved brake systems of the type described which are mechanically uncomplicated, relatively inexpensive, and which may be incorporated in existing brake systems with minimum modification.

It is also an object of the present invention to provide novel master cylinder assemblies effective to actuate two independent brake circuits simultaneously.

As applied to a typical truck, the brake system of the present invention includes primary brakes associated with the front vehicle wheels and secondary brakes associated with the rear vehicle wheels. A dual or tandem master cylinder actuates a pair of independent circuits, each circuit being connected to an actuator at each of the front wheels. The master cylinder and the circuits are so arranged that one circuit remains completely effective to actuate the brakes at each of the front wheels despite failure in the other circuit.

Each rear wheel brake is provided with a pair of actuators, one of the actuators at each wheel being energized by a power cylinder associated with one of the front wheel brakes and the other actuator being energized by a power cylinder associated with the opposite front wheel brake. Accordingly, one actuator in each rear wheel brake is maintained effective despite failure in the circuit associated with either of the power cylinders at the front wheels. Thus braking effort is maintained at all wheels and the maintained braking effort is balanced between the opposite sides of the vehicle despite failure in any one of the primary or secondary brake systems. Additional objects and advantages will become apparent as the description proceeds.

DESCRIPTION OF PREFERRED EMBODIMENTS

Figure 1:
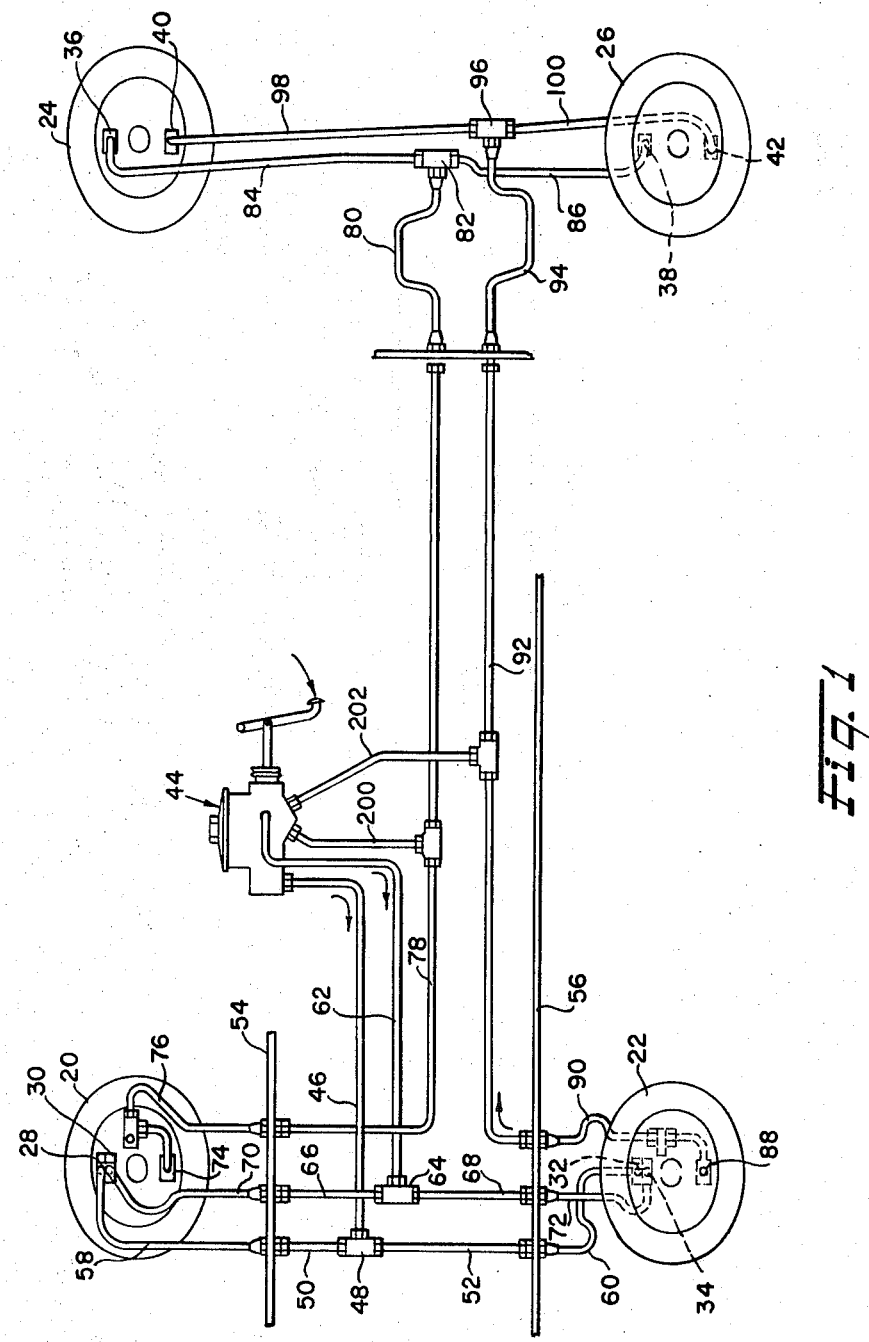
FIG. 1 is a schematic view of a brake system incorporating the present invention.

For present purposes the invention will be disclosed as applied to a brake system in which certain of the individual components are of the type shown in U.S. Pat. No. 3,254,742. Fig. 1 illustrates the brake system as installed in a typical truck having a front wheel set comprising wheels 20 and 22 and a rear wheel set comprising wheels 24 and 26. As used herein the term "wheel set" is intended to comprise all wheels carried by a common axle. In most such vehicles the weight distribution is such that the rear wheels are more heavily loaded than the front wheels. Accordingly, the primary brakes are associated with the front wheels and the secondary brakes are associated with the rear wheels.

The primary brakes, disclosed in greater detail below in connection with FIGS. 2 and 3, comprise a pair of actuators 28 and 30 on wheel 20 and a second pair of actuators 32 and 34 on the wheel 22.

The secondary brakes may be of conventional construction and are preferably of the double acting type disclosed in U.S. Pat. No. 3,037,584. Each of the secondary brakes comprises an actuator 36 or 38 interposed between the upper ends of the brake shoes (not shown) and a lower actuator 40 or 42 interposed between the lower ends of the shoes. In a brake of this type a failure of the upper actuators 36 or 38 or the failure of the lower actuators 40 or 42 results in an approximately 40 percent reduction of the effectiveness of the brakes.

The novel tandem acting master cylinder assembly 44, described in detail below, is effective to supply fluid simultaneously through independent circuits to each of the primary actuators 28, 30, 32 and 34. The actuators 28 and 32 are supplied with fluid through a rigid conduit 46, a T-fitting 48, and rigid conduits 50 and 52. The conduits 50 and 52 are coupled at the opposite frame rails 54 and 56 to flexible conduits 58 and 60 leading to the actuators 28 and 32. Similarly, the circuit for actuating the primary actuators 30 and 34 comprises a rigid conduit 62 connected by a T-fitting 64 to rigid conduits 66 and 68 connected through flexible conduits 70 and 72 to the actuators 30 and 34. The power cylinder 74, which is energized when either of the primary actuators 28 or 30 operates, in connected through a flexible line 76, a rigid conduit 78, a flexible conduit 80, a T-fitting 82, and flexible conduits 84 and 86 to the upper actuators 36 and 38 for the right and left rear vehicle wheels 24 and 26, respectively. Similarly, the power cylinder 88 associated with the left front wheel 22 is connected through a flexible conduit 90, a rigid conduit 92, a flexible conduit 94, T-fitting 96, and flexible conduits 98 and 100 to the lower actuators 40 and 42 associated, respectively, with the right and left rear vehicle wheels.

Figure 2:
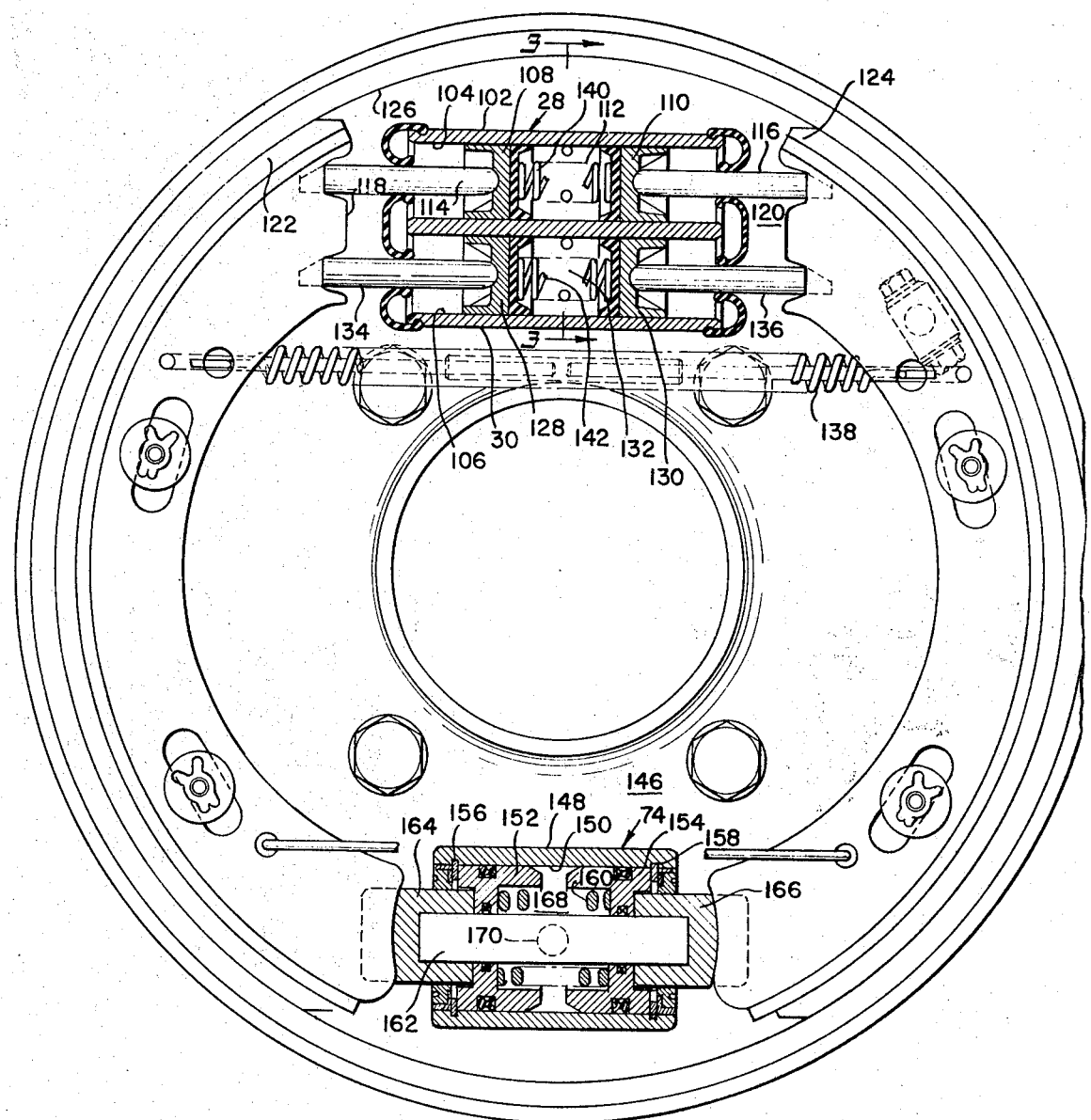
FIG. 2 is a side elevation, partly in section, of the primary brake and associated power cylinder for energizing the secondary brakes.
Figure 3:
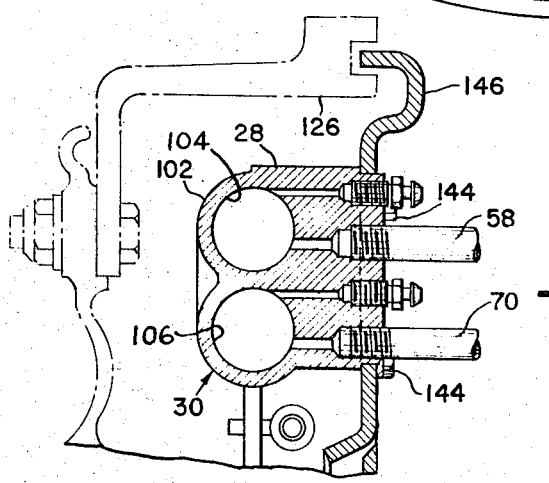
FIG. 3 is a transverse section taken along line 3–3 of FIG. 2.

As shown in FIGS. 2 and 3 the primary brake actuators 28 and 30 are formed in a common housing 102 having parallel bores 104 and 106. The actuator assembly 28 comprises a pair of opposed pistons 108 and 110 slidable in the bore 104 and defining between them a pressure chamber 112 communicating with the pressure line 58. The outer surfaces of the piston assemblies 108 and 110 are connected by bars 114 and 116 to the webs 118 and 120 of the brake shoes 122 and 124, respectively, mounted in conventional manner within a surrounding drum 126.

The actuator assembly 30 is of identical construction and comprises opposed piston assemblies 128 and 130 slidable in the bore 106, the sealed space 132 between the pistons being in communication with the pressure line 70. Bars or rods 134 and 136 connect the pistons to the web of the brake shoes 122 and 124. The usual return spring 138 constantly urges the brake shoes 122 and 124 to the brake off position, returning the pistons of the actuators 28 and 30 to the position shown against the resistance of light compression springs 140 and 142. As shown in FIG. 3 the housing 102 is securely mounted as by bolts 144 to the backing plate 146 nonrotatably secured to the axle housing, not shown.

The power cylinder assembly 74 comprises a housing 148 bolted to the backing plate 146, the housing having a through bore 150 slidably receiving opposed pistons 152 and 154 which are urged outwardly against stop rings 156 and 158 by a compression spring 160. A force transmission bar 162 extends through openings in the piston assemblies 152 and 154 into fittings 164 and 166 which receive the adjacent end of the brake shoe webs 118 and 120, respectively.

In the operation of the brake, when the primary actuators 28 and 30 are energized, the shoes 122 and 124 are urged outwardly into contact with the drum 126. Assuming the drum is rotating in a counterclockwise direction as viewed in FIG. 2 the shoes 122 and 124 will shift in the same direction. As the primary shoe 122 shifts, the piston 152 is displaced inwardly while piston 154 is fixed. Thus the size of pressure chamber 168 between the two pistons is reduced and fluid is transferred from the chamber 168 through an opening 170 to the conduit 76 and through the connected conduits to the upper brake actuators 36 and 38 of the secondary brakes. The brake system in the opposite wheel 22 is of identical construction. The power cylinder 88 associated with this brake, however, is effective only to energize the two lower actuators 40 and 42 of the secondary brakes.

Figure 4:
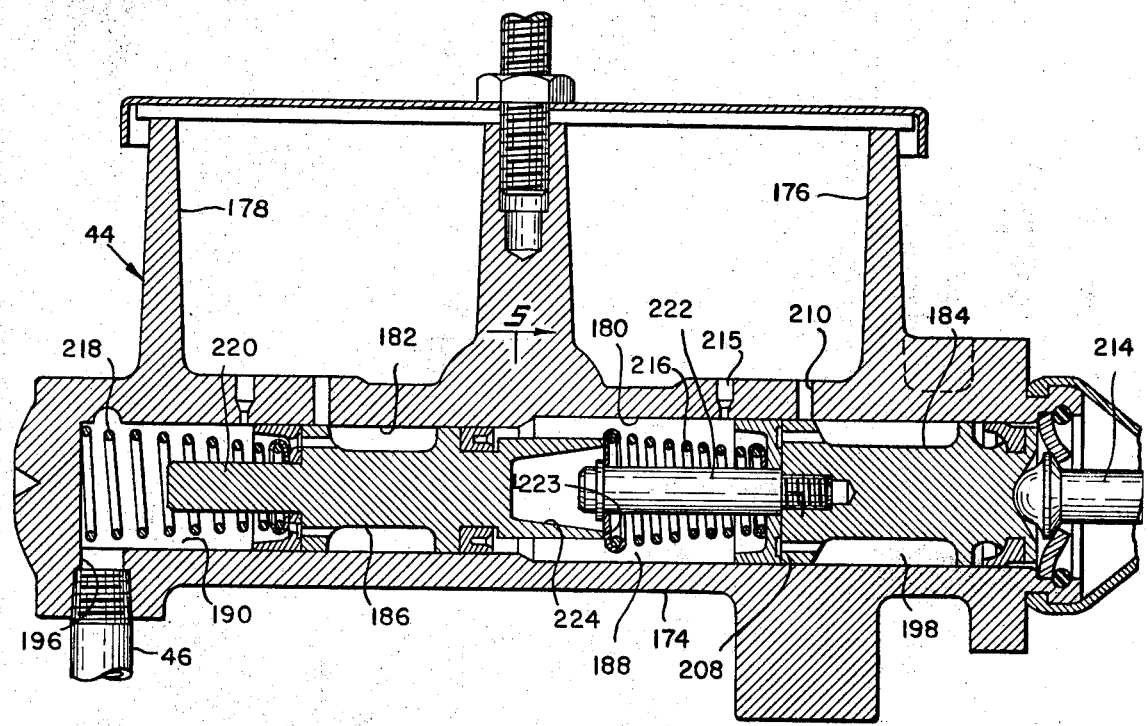
FIG. 4 is a central vertical section illustrating the improved tandem master cylinder of the present invention.
Figure 5:
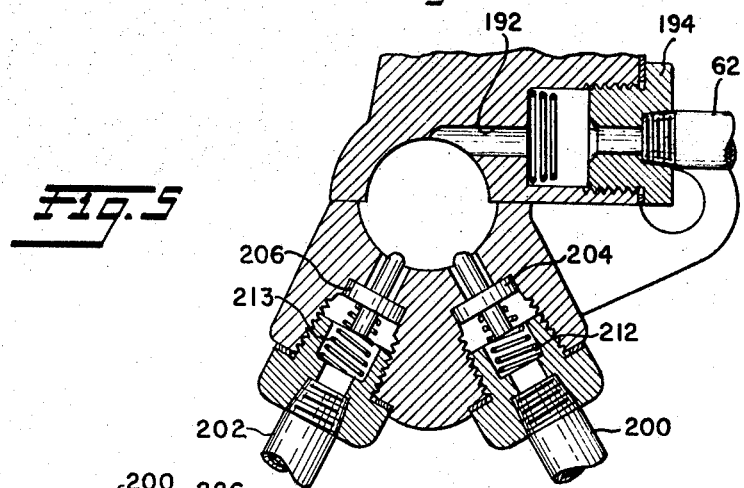
FIG. 5 is a transverse section taken along line 5–5 of FIG. 4.

The brake system thus far described is controlled by a novel tandem or dual master cylinder assembly 44 shown in detail in FIGS. 4 and 5. The master cylinder comprises a body member 174, the upper portion of which is formed as a reservoir having chambers 176 and 178. The main body portion of the master cylinder is provided with larger and smaller bores 180 and 182, the former slidably receiving a piston 184 and the latter slidably receiving a piston 186. The pistons, which are provided with the usual seal assemblies, provide a pair of pressure chambers 188 and 190, the chamber 188 being connected through a passage 192 and a fitting 194 to the conduit 62 and the chamber 190 being connected through a passage 196 to the conduit 46.

A chamber 198 formed around the reduced central portion of the piston 184 is selectively connected to branch lines 200 and 202 connected to the secondary brake circuits by tip valves 204 and 206. These valves are opened by the enlarged forward portion 208 of the piston 184 when the piston is in its fully retracted, *i.e.*, brake off, position as shown in FIG. 4. When the valves are opened they place the secondary systems in communication with the chamber 198 which is in turn in communication through port 210 with the reservoir chamber 176 thus permitting the supply of makeup fluid to the secondary circuit or the relief of excessive pressure in the secondary circuits due to thermal expansion. Immediately upon advancement of the piston 184, the valves 204 and 206 are closed by their associated springs 212 and 213 and are held closed by the development of pressure in the secondary brake circuits.

The master cylinder is energized by the usual pedal operated plunger 214 which engages the piston 184 to displace it to the left as viewed in FIG. 4. Immediately upon displacement of the piston 184 from its fully retracted position shown, the valves 204 and 206 close and the reservoir port 215 is similarly closed so that continued advancement of the piston 184 develops pressure within the chamber 188 which is communicated simultaneously to the primary brake actuators 30 and 34 and to the piston 186 which is thus displaced to the left developing a corresponding pressure in the chamber 190 which is communicated through the conduit 46 to the other primary brake actuators 28 and 32. Since the spring and friction forces involved are negligible the pressure buildup in all of the primary actuators occurs essentially simultaneously.

The actuation of the primary brakes simultaneously energizes the power cylinders 74 and 88 which thus energizes all of the actuators 36, 38, 40 and 42 of the secondary brakes thus achieving simultaneous fully balanced operation of the braking system.

When the brakes are released all components are returned to their initial position by the usual brake return spring and springs 216 and 218 associated with the pistons 184 and 186.

It is a feature of the present invention that the character of the brake operation is unchanged by failure of any component or breakage in any line. For example, if the conduit 46 or any of the associated conduits in this circuit should fail the pressure in the chamber 190 ahead of the piston 186 would fall to zero thus permitting the piston 186 to advance to the right until a projection 220 formed on the front face of the piston bottoms against the end of the bore 182. When the piston 186 reaches its limit position it forms a fixed wall for the end of chamber 188 which continues to be pressurized in the usual manner but with additional pedal travel. The primary brakes continue to be energized through the actuators 30 and 34 producing corresponding actuation of the secondary brakes. Similarly, if the conduit 62 or any of the associated conduits fails the pressure in chamber 188 would be reduced to zero permitting the piston 184 to advance to bring the end of rod 222 carried by the piston into contact with the bottom of a recess 224 found in the rear face of piston 186. Thereafter the pistons 184 and 186 continue to advance as a unit maintaining full pressure in chamber 190 and the associated circuit to the actuators 28 and 32 thus preserving fully balanced operation of all brakes, but at somewhat reduced power.

Similarly, failure of either the conduit 78 or associated conduits, or the conduit 92 or associated conduits deenergizes only one actuator at each rear brake, leaving the remaining actuator at each rear brake fully operative. While this reduces the power input to the rear brakes by some 40 percent nevertheless fully balanced operation is retained.

Figure 6:
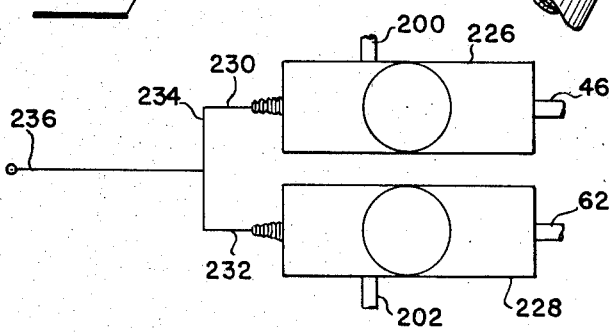
FIG. 6 illustrates a modified form of master cylinder arrangement.

Essentially the same operation can be achieved by substituting a twin master cylinder arrangement for the tandem or dual master cylinder shown in FIGS. 4 and 5. Such an arrangement is shown in FIG. 6. The individual master cylinders 226 and 228 are of identical construction and preferably of the type disclosed and claimed in U.S. Pat. No. 3,374,868 issued March 26, 1968 and owned by applicant's assignee. As shown, the master cylinders independently energize the main pressure conduits 46 and 62 in the primary brake systems. Each is provided with a tip valve, not shown, connected to the respective conduits 200 and 202. To effect simultaneous actuation of the master cylinders, their operating plungers 230 and 232 are rigidly connected to a crossbar 234 in turn connected to the pedal operated push rod 236. The connections between the operating rods 230 and 232 and the crossbar 234 as well as the connection of the rod 236 with the crossbar 234 of limited flexibility so that in the event of loss of pressure in either primary circuit, normal operation of the other master cylinder is retained. The side-by-side parallel master cylinder arrangement of FIG. 6 may be preferred in some cases since it may offer greater versatility in the buildup and installation of the brake system.

I claim:

1. A brake system for a vehicle having a set of front wheels and a set of rear wheels, a pair of primary brake actuators associated with each front wheel, a pair of secondary brake actuators associated with each rear wheel, a pair of independent fluid pressure systems each connected to actuate one actuator on each front wheel, a pair of power cylinders independent of said primary and secondary brake actuators, each associated with one front wheel and adapted to be energized upon the application of the primary brakes at the associated wheel, and independent means connecting each power cylinder to one actuator on each rear wheel.

2. In a vehicle having at least two wheel sets; a brake system comprising, pairs of primary brake actuators, each pair being associated with one wheel of one wheel set; pairs of secondary brake actuators, each pair being associated with one wheel of the other wheel set; a master cylinder assembly; a pair of independent circuits, each connecting said master cylinder to one of each pair of said primary actuators; a plurality of power cylinders, each associated with one wheel of said one wheel set, and a pair of further independent circuits, each connecting one power cylinder to one of each pair of secondary brake actuators, said power cylinders being adapted, upon actuation of said primary actuators, for actuating associated secondary actuators.

3. The brake system according to claim 2 wherein said master cylinder assembly comprises means providing a pair of fluid filled pressure chambers, each connected to one of said circuits, a first piston forming a movable wall between said chambers, and a second piston forming a movable wall of one chamber whereby movement of said second piston inwardly of said one chamber pressurizes the fluid in each chamber.

4. The brake system according to claim 2 wherein said master cylinder assembly comprises means forming a chamber having an outlet adjacent one end wall connected to one of said circuits and an outlet intermediate its ends connected to the other of said circuits, a first piston forming the opposite end wall of said chamber and adapted upon displacement to pressurize fluid in said chamber and a second piston slidable in said chamber between said outlets to isolate said first outlet from said second outlet.

5. The brake system according to claim 2 wherein said master cylinder assembly includes a fluid reservoir together with means in said master cylinder for connecting said secondary brakes to said reservoir when all of said brakes are released.